United States Patent [19]

Atherton et al.

[11] 3,920,000

[45] Nov. 18, 1975

[54] TEMPERATURE CONTROLLER FOR INCUBATORS

[76] Inventors: Harry D. Atherton, 6247 Graceland Ave., Cincinnati, Ohio 45237; Neil K. Edwards, 7711 Shadowhill Way, Cincinnati, Ohio 45242; Paul H. Perlstein, 4088 Rosehill Ave., Cincinnati, Ohio 45229

[22] Filed: May 22, 1974

[21] Appl. No.: 472,362

[52] U.S. Cl. .................................. 128/1 B; 236/3 R
[51] Int. Cl.[2] ........................................ A61G 11/00
[58] Field of Search............ 128/1 B, 2 H, 371, 402, 128/372, 373, 30.2, 30, 204; 236/3 R, 78 B, 46 D; 237/13; 119/37

[56] References Cited
UNITED STATES PATENTS

| | | | |
|---|---|---|---|
| 3,338,233 | 8/1967 | Grosholz et al. | 128/1 B |
| 3,464,388 | 9/1969 | Stout | 128/1 B |
| 3,789,853 | 2/1974 | Reinhard | 128/1 B |

FOREIGN PATENTS OR APPLICATIONS

| | | | |
|---|---|---|---|
| 285,777 | 9/1968 | Australia | 128/1 B |
| 1,232,048 | 5/1971 | United Kingdom | 128/1 B |

*Primary Examiner*—Richard A. Gaudet
*Assistant Examiner*—Henry J. Recla
*Attorney, Agent, or Firm*—Wood, Herron & Evans

[57] ABSTRACT

A method and apparatus for controlling the temperature inside an incubator. The incubator includes a heater for heating the air circulating therein. The temperature controller measures the skin temperature of an infant therein, the incubator air temperature and the temperature of the incubator walls which, through heat radiation, have a significant effect on the infant's skin temperature. The controller responds to the measured temperatures to either turn on or turn off the incubator air heater so as to keep the temperature difference between the infant's skin and the environment affecting skin temperature below a preset maximum. The controller also causes the rate of temperature changes within the incubator to be minimized.

22 Claims, 4 Drawing Figures

TEMPERATURE CONTROLLER FOR INCUBATORS

BACKGROUND OF THE INVENTION

This invention relates generally to the field of controllers for controlling infant incubators and, more particularly to a controller for an infant incubator which controls the temperature of the air circulating therein in a manner preventing rapid changes of environment temperature as well as maintaining environment temperature close to the skin temperature so as to maintain the infant in a minimum metabolic state.

It is well known that some infants and especially some prematurely born infants at birth are not physiologically well enough developed to be able to survive without special medical attention. A frequently used medical aid for such infants is the incubator. The primary objective of the incubator is to provide an environment which will maintain the infant at a minimum metabolic state thereby permitting as rapid physiological development as possible.

In the past, many infant incubators have been developed. These incubators have utilized basically two different approaches at maintaining temperature inside the incubator. One approach employs a thermostat control to measure the air temperature inside the incubator and turn on or turn off an air heater in response to changes in the air temperature thereby maintaining air temperature within the incubator at a constant value. This approach, however, does not provide any control over the infant's temperature.

A somewhat more advanced approach is an incubator temperature control system which includes a transducer to measure infant skin temperature. This approach, however, has tended to produce relatively rapid and large air temperature variations in response to measured skin temperature changes which changes are caused frequently by artifact, i.e., a foreign body resting on the skin temperature probe or other effect causing the measured temperature to vary independently from the infant's actual temperature. A rapid and large temperature variation in response to an artifact is inappropriate and, in some instances, will induce apnea (cessation of spontaneous respiration) in some infants. Under some circumstances, apnea may even be fatal.

In view of the foregoing difficulties stemming from prior approaches for incubator temperature control, it is the primary objective of the present invention to provide an incubator temperature controller which adjusts the environment temperature inside the incubator to a level that maintains the infant at a minimum metabolic state.

It is a further objective of the invention to provide an incubator temperature controller which adjusts the environment temperature within an incubator so as to prevent rapid and sizeable air temperature changes so as to reduce the likelihood of causing apnea in susceptable infants.

It is still a further objective of the invention to provide an incubator temperature controller which responds to changes in the infant's skin temperature so as to adjust the environment temperature within the incubator to maintain the infant at a minimum metabolic state.

It is still a further objective of the invention to control the air temperature within the incubator in a manner responsive to the effect on the infant's skin temperature of heat radiation from the incubator walls to maintain the infant at a minimum metabolic state.

It is yet another objective of the invention to provide an incubator heat controller responsive to changes in infant skin temperature in a manner to prevent rapid changes in environment temperature.

It is still another objective of the invention to provide an incubator temperature controller which maintains the skin temperature to environment temperature gradient below a preset upper limit so that the environment temperature is adjusted according to the infant's requirements.

It is yet another objective of the invention to provide an incubator temerature controller which automatically adjusts its operation according to the capability of the infant to generate body heat so as to maintain his skin temperature within a certain desired range.

Brief Description

The present invention is predicated, in part, on the concept of controlling incubator air temperature in response to measured skin temperature, measured air temperature, calculated environment temperature and calculated environment to skin temperature gradient. More particularly, the invention is predicated on the concept that an infant's skin temperature will change in part due to metabolic processes but also in response to air temperature changes as well as the effect of heat radiation to the walls of the incubator.

More specifically, in one embodiment of the invention, a conventional incubator with an air circulation system is used. This air circulation system includes, among other things, an air heater. A sensor is provided to detect the incubator air temperature. Also, a further sensor is provided to measure the infant's skin temperature. Since, heat exchange by radiation with the incubator walls has been shown to have a significant effect on infant skin temperature, sensors are also provided to measure the wall temperature of those incubator walls which, through heat radiation, significantly affect the infant's skin temperature. the top wall is especially important in this respect because phototherapy is frequently used to treat jaundice in premature infants. Such phototherapy requires a shining lamp on the infant. During such treatments, however, a large amount of heat enters the incubator from outside and this entering heat significantly affects the environment within the incubator. On the other hand, when phototherapy is not being employed, the top wall tends to radiate heat into the atmosphere around the incubator. Likewise, the front and rear walls also contribute to radiation losses from the incubator. Therefore, the temperature of the top, front and rear walls are considered by the controller in determining whether or not to turn on the incubator air heater.

Once all of the various temperatures, as outlined above, have been measured, the controller calculates an environment temperature. Environment temperature is defined as equaling one-half the measured incubator air temperature plus one-half the sum of the measured wall temperatures divided by the number of walls whose temperature is measured. Once the environment temperature has been calculated, a control temperature is calculated. The control temperature is defined as being equal to one-half the measured skin temperature added to one-half the calculated environment temperature. In normal operation of the incubator, the incubator heater is turned off if the control temperature exceeds a preset maximum.

In order to provide a margin of safety in the incubator operation, absolute maximums are established for the skin temperature, the air temperature, and the environment to skin temperature gradient. If any absolute maximum is exceeded, the incubator air heater is turned off.

A further aspect of the invention is predicated on the concept of adjusting the environment temperature within the incubator so as to respond to the metabolic heat production of the infant. More particularly, in accordance with this aspect of the invention, the set point against which the control temperature is compared is gradually adjusted upwardly or downwardly depending on whether the infant's skin temperature is either below or above a lower or upper skin temperature adaptive limit. If the infant's skin temperature is between these adaptive limits, the set point is not adjusted. On the other and, if the skin temperature is above the upper skin temperature adaptive limit, the set point is adjusted gradually downwardly thereby responding to the infant's capability to generate heat. However, if the skin temperature is below the lower skin temperature adaptive limit, the set point is gradually increased so as to bring the skin temperature of the infant back within the desired skin temperature range. This upward adjusting of the set point is operative to modify the operation of the control so as to compensate for the fact that the infant is not generating sufficient heat to maintain his skin temperature within the desired limits. The rate of adjustment of the set point is deliberately made slowly to prevent rapid environment temperature changes within the incubator.

BRIEF DESCRIPTION OF THE DRAWINGS

The invention will become clearer from the following detailed description taken in connection with the drawings which form a part of the original disclosure wherein.

DETAILED DESCRIPTION

Figure 1:
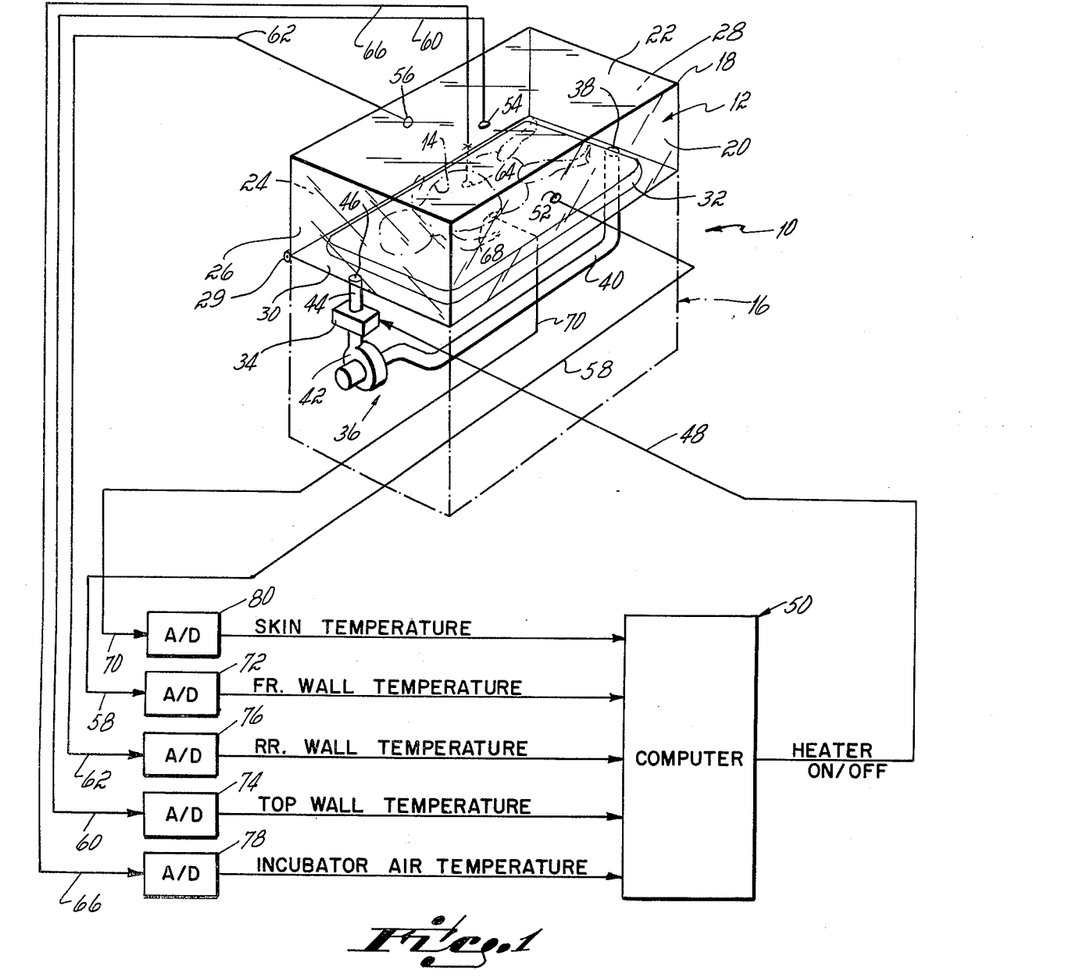
FIG. 1 is a schematic diagram of the invention.

The present invention is shown diagrammatically in FIG. 1 with an incubator shown generally at 10. The incubator 10 itself comprises any known infant incubator including an air heater and other environment controllers in the air circulation system of the incubator. Typically, the incubator has a compartment, shown generally at 12, in which an infant 14 is placed. The environment within the infant compartment 12 is carefully controlled by environment control apparatus located in the control compartment, shown generally at 16.

The infant compartment 12 has a hood 18 which typically includes a front wall 20, a top wall 22, a rear wall 24, a head wall 26 and a foot wall 28. The hood 18 is hinged to the control compartment 16 preferably along the lowermost edge of the rear wall 24 as shown at 29.

The mattress support 30 of the control compartment 16 provides a supporting surface for supporting an infant mattress or pad 32 on which the infant 14 rests. The pad 32 is somewhat smaller than the outer dimension of the mattress support 30 so as to permit, as will become clearer later, air to be introduced into the infant compartment 12 as well as exhausted therefrom.

Access may be provided to the infant compartment 12 via sleeves or other means (not shown) to thereby permit attending medical personnel to handle the infant 14 without opening the hood 18. In addition, the walls 20, 22, 24, 26 and 28 are generally made of a transparent material so that the infant 14 can be observed from outside the incubator 10. In some instances, some of the walls 20, 22, 24, 26 and 28 may be nontransparent although under most circumstances all of the walls and especially the top wall 22 is transparent to permit infant observation and phototherapy. Phototherapy involves shining a powerful light onto the infant in the incubator which is possible only with transparent walls. Phototherapy is often used to treat jaundice in prematurely born infants.

The control compartment 16 houses, in most incubators, numerous devices for controlling the environment within the infant compartment 12 such as temperature, humidity and oxygen controls. The only such device of interest in the present invention is the incubator air heater 34 which comprises part of the air circulation system shown generally at 36. The air circulation system 36 has an air return opening 38 through the mattress support 30 disposed generally at the foot of the infant near the foot wall 28. The air return opening 38 communicates with a return duct 40 which has an air blower 42 disposed at its other end. The output of the blower 42 forces air into the air heater 34 and then through a duct 44 which communicates with an air input opening 46 which passes through the mattress support 30. In operation, the air circulation blower 42 draws return air from the infant compartment 12 through the return opening 38 and into the duct 40. The blower 42 then forces the air into the air heater 34 and then through the duct 44 and into the infant compartment 12 via the opening 46. While the air circulation system 36 is shown as completely recirculating, the actual incubator air circulation system usually includes means for exhausting some air and permitting some fresh air to enter. For simplicity, as this is not part of the invention, this aspect of the air circulation system 36 is not shown in FIG. 1.

As indicated earlier, the control compartment 16 includes many other control devices for maintaining a suitable environment for the infant. These controls (not shown) may include controls for regulating the percentage of oxygen in the infant's environment as well as control for regulating the air humidity. These controls are part of the circulation system 36 in conventional incubators, however, these controls do not comprise a part of the invention and, for simplicity, have not been included.

As indicated earlier, one of the primary objectives of the invention is to closely control the environment temperature for the infant. To accomplish this, the air heater 34 is either turned on or turned off in response to "turn on" or "turn off" signals transmitted over a control wire 48 from a computer 50. The time at which the heater is turned on or turned of is determined by the computer 50 in response to various temperatures measured within the infant compartment 12.

In the peferred embodiment of the invention, the computer 50 comprises a PDP-11 computer manufactured by the Digital Equipment Corporation. It will be readily recognized by those of skill in the art that the particular computer 50 mentioned is but one of many other general purpose digital computers that can be used. Indeed, the general purpose computer 50 can be replaced by a specially designed controller operative in a manner to be described in greater detail later.

As indicated above, the incubator heater control of the present invention operates to adjust the environment temperature within the infant compartment 12 to a level conducive to maintaining the infant 14 at a minimum metabolic state. In order to do this, numerous constraints are provided to assure that the air heater 34 is properly operated.

As noted earlier, heat flow through the incubator walls has a significant effect on the environment inside the incubator. For the incubator 10 of FIG. 1, the walls contributing most to heat radiation either into or out of the infant compartment 12 are the front wall 20, the top wall 22 and the rear wall 24. These walls contribute most to radiation of heat into or out of the compartment 12 because they are exposed broadside to a greater portion of the infant's body than are the head wall 26 and the foot wall 28. For incubators with a different design, other walls may contribute to radiation of heat. Since the walls 20, 22 and 24 contribute so significantly to the incubator environment temperature, temperature sensors 52, 54 and 56 are respectively located on the front wall 20, the top wall 22 and the rear wall 24 for measuring the temperature of these walls. The sensors 52, 54 and 56 typically comprise a thermistor or other thermally sensitive device for producing analog electrical signals respectively on the wires 58, 60 and 62. In the preferred embodiment of the invention, the temperature of the head wall 26 and the foot wall 28 are ignored because their consideration does not significantly affect the commutation of the environment temperature.

In addition to measuring the temperature of the walls 20, 22, and 24, an air temperature sensor 64 is suspended from the top wall 22 and is located in the air space within the infant compartment 12 directly above the infant 14 at a point generally disposed midway between the infant's head and his feet as well as midway between the infant 14 and the top wall 22. The sensor 64 produces analog electrical signals on the wire 66 indicative of the air temperature at the sensor 64 location.

A skin temperature sensor 68 is attached to the skin of the infant 14 so as to measure his skin temperature. The sensor 68 produces analog electrical signals on the wire 70 indicative of the infant's skin temperature.

The analog electrical signals on the wires 58, 60, 62, 66 and 70 are connected respectively to the inputs of the analog to digital converters 72, 74, 76, 78 and 80. The output of each of these analog to digital converters 72, 74, 76, 78 and 80 respectively have digital signals thereon respresentative of the front wall temperature, the top wall temperature, the rear wall temperature, the incubator air temperature, and skin temperature. The above enumerated temperatures in digital form are utilized by the computer 50, in the manner described in greater detail below, to either turn on or turn off the incubator air heater 34 via signals transmitted over the wire 48 from the computer 50 to the incubator 10.

Figure 2:
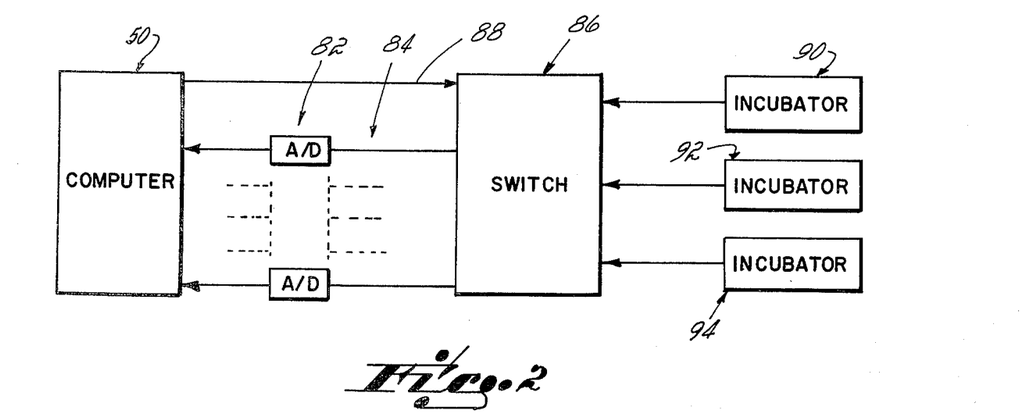
FIG. 2 is a schematic diagram of the invention operating to control more than one infant incubator.

It is readily apparent, to those of skill in the art, that the apparatus shown in FIG. 1 can be utilized, with slight modification, for controlling more than one incubator 10. One such configuration is shown in FIG. 2 which includes a computer 50 and a plurality of analog to digital converters shown generally at 82 which are located near the computer 50. These analog to digital converters 82 are connected via a plurality of wires shown generally at 84 with a remotely located multiplexing switch shown generally at 86. The heater on/off signals are transmitted from the computer 50 to the multiplexing switch 86 via a wire 88.

The multiplexing switch 86 sequentially connects the incubators 90, 92 and 94 to the wires 84 and the wire 88 thereby permitting the computer to control the air temperature in each of the incubators 90, 92 and 94, one at a time. As such, the incubators 90, 92 and 94 may be located physically in different rooms or even in other buildings.

In applications where the incubators 90, 92 and 94 are located in buildings other than that housing the computer 50, telephone communication lines or the like are well suited for the transmission of information between the computer and the incubators, however, an information serializer of the type well known in the prior art for converting all the temperature data into serial data is necessary if only one telephone communications line is available between each incubator and a multiplexer switch located at the computer 50 site.

The measured temperature information from the incubator 10 is utilized in the following manner. Normally, the computer 50 transmits a signal to the air heater 34 which causes the heater to turn on so as to increase the incubator air temperature. The computer 50, however, turns off the heater when any one of a number of preset maximum temperatures are exceeded. For example, the computer 50 will turn off the heater 34 whenever the measured incubator air temperature exceeds a preset maximum. In the preferred embodiment of the invention, the upper limit of the incubator air temperature sensed by the sensor 64 is 38.0°C. Any time the air temperature is higher than this preset maximum, the heater 34 is turned off. While the preset maximum air temperature preferably is 38.0°C, the preset maximum air temperature can be adjusted, if desired, to suit particular infants whose needs may be different.

A second upper limit which cannot be exceeded without turning off the air heater is the measured skin temperature. In the preferred embodiment of the invention, the upper limit for the measured skin temperature is 36.5°C. It should be noted, however, that the specific skin temperature upper limit, i.e., 36.5°C, can be changed to suit the needs of particular infants.

As indicated generally above, both the air temperature within the infant compartment 12 as well as the wall temperature of walls adjacent the infant's body have a definite effect on infant skin temperature. Indeed, it has been suggested that as much as one-half of the environment temperature, i.e., the temperature of the air and other objects in the incubator to which the infant's metabolism responds is contributed by the effect of heat radiation through the incubator walls. Therefore, in accordance with the present invention, an environment temperature is calculated by the computer 50. The environment temperature itself is equal to one-half the measured air temperature added to one-half the average wall temperature of those incubator walls that, through heat radiation, significantly affect the infant's metabolic rate. For the preferred embodiment shown in FIG. 1, the environment temperature (TE) is computed according to the following equation:

$$TE = \frac{1}{2} TA + 1/6 \, TFW + 1/6 \, TTW + 1/6 \, TRW$$

where TA is the measured air temperature, TFW is equal to the measured front wall temperature, TTW is equal to the measured top wall temperature and TRW is equal to the measured rear wall temperature. As indicated earlier, the incubator of FIG. 1 only has three walls that significantly affect the infant's metabolic rate, namely, the front wall 20, the top wall 22 and the rear wall 24. In other incubators having other walls that significantly affected the infant's metabolic rate, the temperature of these other walls would be included in the average wall temperature.

The calculated environment temperature is utilized in two different calculations. When a larger positive gradient is present, the infant tends to be warmed rapidly and this may be harmful. Consequently, the temperature controller of the present invention is operative to turn off the heater 34 if the environment to skin temperature gradient exceeds a preset maximum which, for the preferred embodiment, is set at 3.0°C. This figure may be changed, however, the environment to skin temperature gradient check is made primarily as a safety check as the control temperature check normally keeps the environment to skin temperature gradient below 2°C.

Environment to skin temperature gradient is calculated simply by subtracting the measured skin temperature (TS) from the calculated environment temperature (TE). In other words, the environment to skin temperature gradient (ESG) is defined by:

$$ESG = TE - TS$$

where ESG is the environment to skin temperature gradient with TE and TS being as defined above. Whenever the environment to skin temperature gradient (ESG) exceeds +3.0°C in the preferred embodiment, the heater 34 is turned off.

The environment temperature (TE) is also utilized in calculating a control temperature. The control temperature (KSKE) is defined by:

$$KSKE = \frac{1}{2} TS + \frac{1}{2} TE$$

where KSKE is equal to the control temperature, TS equals the measured skin temperature and TE is the calculated environment temperature. Whenever the control temperature (KSKE) exceeds an upper limit known as the set point (SETP) the computer 50 responds by turning off the heater 34. In operation, turning the heater on and off due to fluctuations of the control temperature below or above the set point has proven to maintain the environment temperature to skin temperature gradient below 2°C.

The invention includes automatic adjustment of the set point to adjust the operation in response to the metabolic requirements of the infant. If the infant becomes cold, the set point is adjusted upwardly to warm him. If the infant becomes warm, the set point is adjusted downwardly to cool him. When the computer 50 is first started to control the air heater, the set point (SETP) is set to an initial value of 35.5°C. The set point (SETP) is thereafter subject to change when the controller enters "slew mode," a mode of operation described in greater detail later wherein the set point is shifted upwardly or downwardly at a slow rate to adjust the incubator operation to the infant's metabolic requirements.

Figure 3:
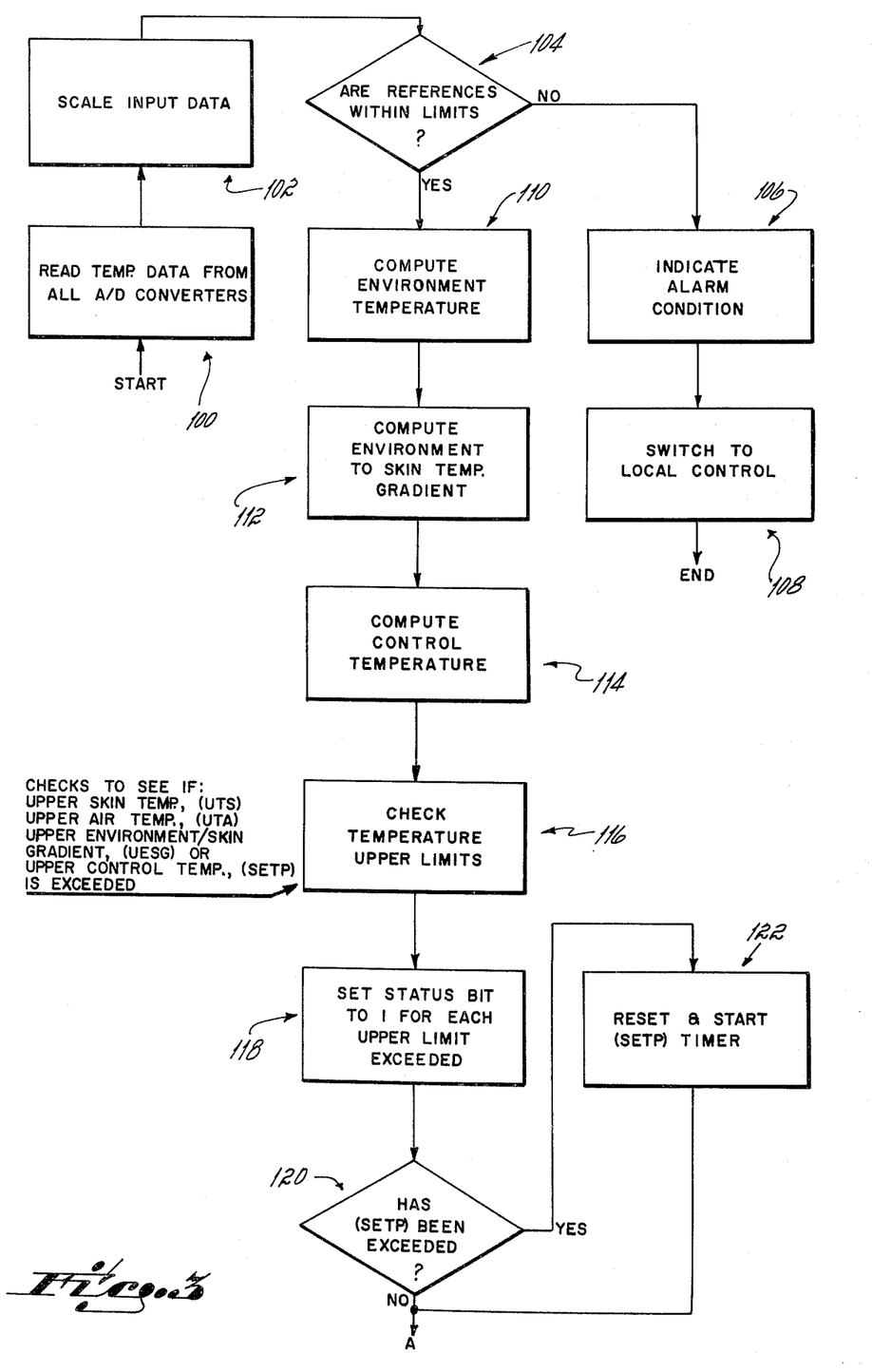
FIGS. 3 and 4 comprise a flow chart of the method of controlling the incubator temperature as performed by the apparatus shown in FIG. 1.
Figure 4:
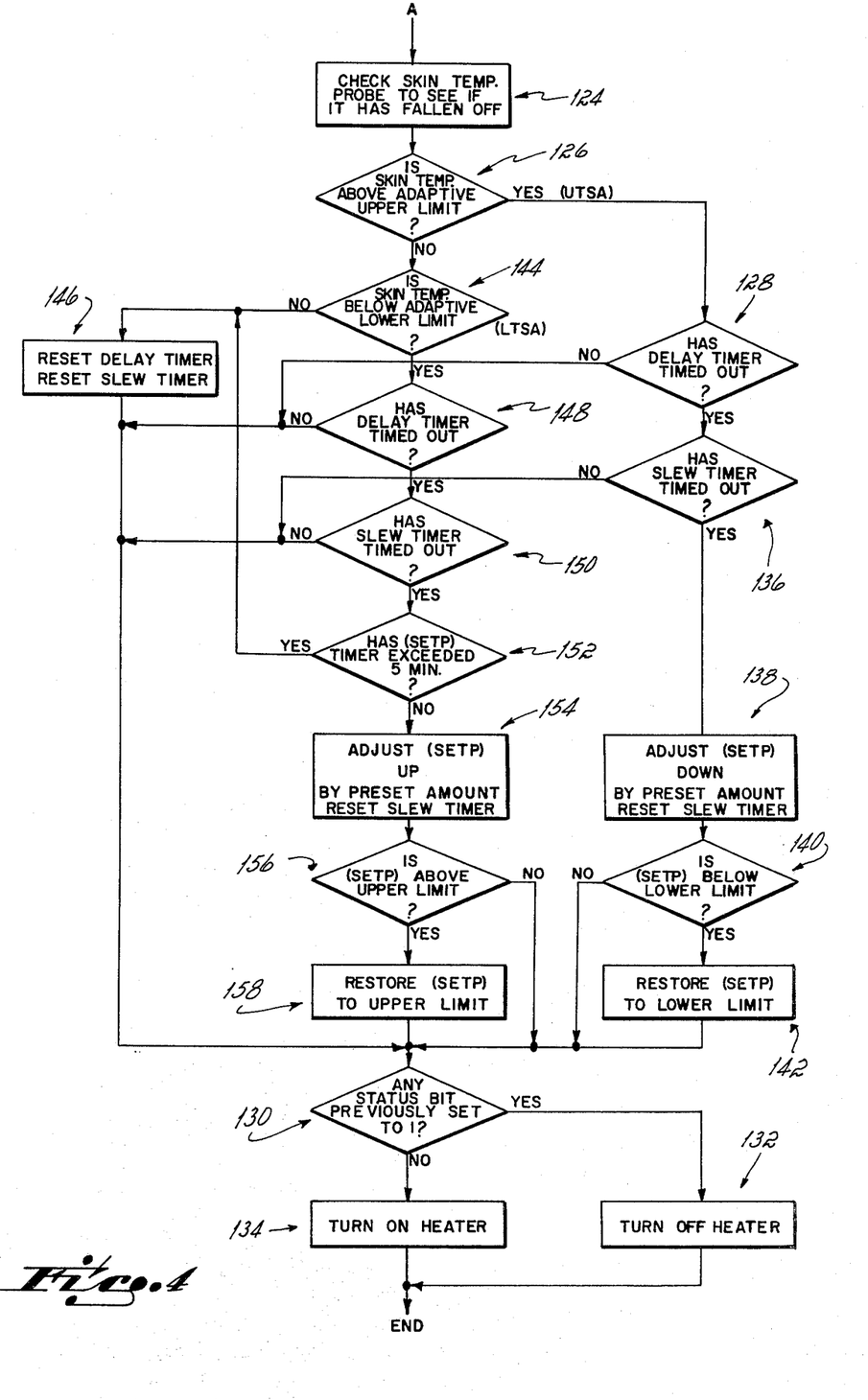

The calculations hereinabove decribed are depicted in the flow chart of FIG. 3 which describes part of the assembly language program for the PDP-11 which is included below. The order of the steps shown in FIG. 3 is that of the specific program implementation, however, it will be recognized by those skilled in the art that many of the steps of the flow chart can be implemented in different order without affecting the system operation. It should also be noted that the method of controlling the incubator air heater as depicted by the flow charts of FIGS. 3 and 4 is executed in the computer 50 once every second. The controls necessary to do this have not been included because they are well known and also they do not form a part of the invention. However, the computer 50 either turns on or turns off the incubator air heater 34 once every second.

Referring to FIG. 3, the computer 50 is operative in a manner well known in the art to read temperature data from each of the analog to digital converters as indicated by step 100 in FIG. 3. This data is then scaled as indicated in step 102 to form a binary number having 15 binary bits with 5 bits to the left of the binary point and 9 bits to the right of the binary point. For other implementations, the data may be scaled in another suitable manner.

As indicated by the decision step 104, the program is operative to check to see whether the references are within limits. This reference check is a check on the integrity of the communication network between the computer and the temperature sensors in the incubator. While this integrity check is desirable in order to assure that communications between the incubator 10 and the computer 50 are functioning properly, the step does not itself form a part of the invention.

If it should be determined at step 104 that the references are not within limits, i.e., there is a communications problem between the incubator 10 and the computer 50, an alarm condition is indicated, as shown in the step 106, so that attending personnel will be alerted to the communications problem between the computer 50 and the incubator 10. After this alarm condition is indicated by step 106, the incubator is switched to local control, i.e. the backup controls used when the computer 50 is not operational, as indicated at step 108 and computer processing is thereafter suspended.

Under normal operating conditions, however, the references will be within the expected limits and, therefore, the program flow will be from the decision step 104 to step 110. In step 110, the environment temperature is calculated. This calculation is in accordance with the above mentioned equation. After the environment temperature is calculated in step 110, the environment to skin temperature gradient is calculated in step 112. The control temperature is then calculated in step 114. In step 116, checks are made to determine whether any of the preset upper limits have been violated. Specifically, a check is made to determine whether the skin temperature exceeds a preset upper skin temperature limit. Also, the air temperature is checked aginst a preset upper limit. The environment to skin temperature gradient is also checked against a preset upper limit. A further check is performed to determine if the control temperature is above the set point (SETP).

A status word is generated in step 118 having a bit in the status word allocated to each of the checks performed in step 116. For each check in step 116 where the preset upper limit is exceeded, the status bit corresponding thereto is set to a 1. If the check limit is not exceeded, however, the status bit corresponding thereto is set to a zero.

In the decision step 120, a check is made of the status bit indicating whether the set point (SETP) has been exceeded. If the set point has been exceeded, the computer branches to step 122 and a SETP timer is reset and started. The SETP or set point timer is reset and started each time the set point has been exceeded. By checking this set point timer preiodically in a manner described later, it is possible to determine whether the control temperature upper limit is the upper limit which is controlling the air heater as opposed to whether the upper limit of skin to environment temperature gradient, the upper skin temperature limit or the upper air temperature limit is controlling.

As indicated in step 120, if the set point (SETP) has not been exceeded the flow passes to point A in FIG. 4. Also, after the step indicated at 122 is performed, flow also passes to point A on FIG. 4.

It should be noted that the operations described in the flow chart of FIG. 3 is all that is necessary to determine whether the incubator air heater should be turned on or turned off. The actual turning on or off of the heater is performed later in the control flow and is shown in FIG. 4. Suffice to say, the heater is turned off any time any one of the status bits are set to a 1 in the step 118. On the other hand, if no status bits are set to a 1, the heater is turned on.

The flow chart in FIG. 4 is directed primarily to the program flow causing the set point (SETP) to be adjusted either upwardly or downwardly in response to a determination as to whether the skin temperature is above the upper skin temperature adaptive limit (UTSA) or below the lower skin temperature adaptive limit (LTSA) for a predetermined period of time. Additionally, in order to avoid rapid temperature changes within the incubator, the adjustment of the set point (SETP) is made at a rate not exceeding 0.01°C per minute. This gradual adjustment of the set point (SETP) is necessary to avoid inducing apnea.

The process of adjusting the set point (SETP) either upwardly or downwardly is referred hereinafter as slewing. The process for accomplishing slewing is shown in greater detail in the flow chart shown in FIG. 4.

Referring specifically to FIG. 4, the program flow enters at point A from FIG. 3. The first operation of the controller, however, is not directly related to the invention. This operational step is shown at 124 whereat a check is performed to determine whether the skin temperature sensor 68 (see FIG. 1) has fallen off the infant's body. It will be assumed for the purpose of this discussion that the check has passed favorably and that the sensor 68 is firmly attached to the infant's skin so as to provide accurate skin temperature measurements. As such, the flow passes directly to step 126.

In decision step 126, the measured skin temperature is checked against the upper skin temperature adaptive limit. For the purpose of this discussion, the upper skin temperature adaptive limit (UTSA) is set at 36.0°C. While this particular limit has been established, it will be recognized by those skilled in the art that this limit can be adjusted to suit the needs of individual infants.

If the skin temperature is above the upper skin temperature adaptive limit, the program flows to the next decision step, shown at 128, whereat a delay timer is checked. This delay timer is, in the preferred approach, set to 0 minutes each time the skin temperature is above LTSA and below UTSA as described in greater detail later. After being set, the delay timer counts up. Then, each time the program is executed, i.e., at a rate of once a second, this delay timer is checked at the decision step 128 to determine if it has timed out, i.e., if the timer has counter up to 5 minutes. If the delay timer has not timed out, the decision step 128 causes flow to proceed to the decision step 130 whereat a check is performed to determine whether any of the status bits were previously set to one in step 118 on FIG. 3. If any status bit was previously set, the decision step 130 causes flow to pass to the step 132 which causes the heater to be turned off because either the upper skin temperature limit was exceeded, the upper air temperature limit was exceeded, the upper environment to skin temperature gradient was exceeded or the upper control temperature limit (SETP) was exceeded. After exiting step 132, the process ends, however, it is repeated again one second later.

Should the decision step 130 determine that none of the status bits were previously set to a one in the step 118, then control passes to step 134 whereat the heater is turned on. The heater turn on or turn off command generated respectively at steps 134 or 132 is transmitted from the computer 50 over the wire 48 to the heater 34.

Referring back to decision step 128, if the upper skin temperature adaptive limit is exceeded continually for a period longer than five minutes, this condition causes the delay timer to time out and the program flow will pass to decision step 136 whereat a slew timer is checked to determine whether or not it too has timed out, i.e., the slew timer equals one minute. It should be noted that the first time control flows from decision step 128 to decision step 136, the slew timer has timed out. Therefore, since the slew timer has timed out, control passes directly to step 138. In step 138, the set point SETP is adjusted downwardly by a preset amount, preferably equal to 0.01°C. Then the slew timer is reset to zero so that the next time step 136 is executed (one second later) control will pass from step 136 to step 130.

After step 138 is complete, the control passes on to the decision step 140 whereat the set point (SETP) is checked to determine whether or not it is below the lower limit. In the preferred embodiment of the invention, the lower set point limit is 34.5°C. This lower limit has been deliberately selected, however, it may be changed if circumstances peculiar to a particular infant warrant such a change. If the set point is not below the preset lower limit as determined by decision step 140, control passes directly to the decision step 130 and processing continues in a manner previsouly described.

However, should it be determined in decision step 140 that the set point is below the lower limit, then control passes to step 142 whereat the set point is restored to the lower set point limit and then control passes to decision step 130.

The foregoing discussion with respect to FIG. 4 has described what is referred to as downward slewing, i.e., the downward adjustment of the set point. It should be noted that a number of conditions have to occur before downward slewing will take place. In the first place, the delay timer is operative to prevent downward slewing unless the upper skin temperature adaptive limit is exceeded for a period of five minutes. Then, the slew timer is operative to cause downward adjustment of the set point once every minute thereafter until the measured skin temperature falls below the upper skin temperature adaptive limit or until the set point is shifted downward to the lower set point limit, i.e., 34.5°C. Furthermore, each downward step of the set point during downward slewing is by a preset amount, preferably small so that the rate at which the set point is adjusted downwardly is low thereby avoiding rapid temperature change in the incubator. The preferred downward slewing rate is 0.01°C per minute although other slewing rates can be used so long as the rate of change is not large enough to cause rapid incubator temperature changes which sometimes induce apnea. Indeed studies have shown that temperature changes of as much as 5°C per hour are common in currently available incubators and that this rapid rate of temperature change may induce apnea. Clearly, the rate of temperature change must be kept below 5°C per hour. A slewing rate of 0.01°C per minute appears to be low enough to avoid apnea induced by rapid temperature change.

Returning again to the decision step 126, when the measured skin temperature is below the upper skin temperature adaptive limit, then flow passes on to decision step 144. At this point, the measured skin temperature is checked to determine if it is below the lower skin temperature adaptive limit. The lower skin temperature adaptive limit, in the preferred embodiment of the invention, is defined to be 35.5°C although this lower skin temperature adaptive limit may, as the situation dictates, be adjusted to suit the requirements of a particular infant. Should the decision step 144 determine that the skin temperature is above the lower skin temperature adaptive limit, control passes to step 146 whereat the delay timer and the slew timer are reset. As such, so long as the infant's measured skin temperature remains above the lower skin temperature adaptive limit and below the upper skin temperature adaptive limit, the delay timer and the slew timer will be reset. However, if the skin temperature is either above the upper skin temperature adaptive limit or below the lower skin temperature adaptive limit, the delay timer and the slew timer are not reset.

After completion of step 146, flow passes directly to decision step 130 and the control proceeds as previously described.

If it is determined in decision step 144 that the measured skin temperature is below the lower skin temperature adaptive limit (LTSA) then flow passes to the decision step 148 where the delay timer is checked to determine whether it has timed out. If the delay timer has not timed out, control passes from decision step 148 to decision step 130 and control continues in the manner previously described. Once the delay timer does time out, however, flow passes to decision step 150 where the slew timer is checked. If the slew timer has not timed out, flow then passes to decision step 130 and control continues in the manner as previously described. However, if the slew timer has also timed out, control passes to an additional decision step 152 whereat the set point timer is checked to determine whether it has exceeded five minutes. It will be recalled that step 122 caused the SETP timer to be reset and started every time the set point was exceeded. Therefore, if the set point timer (SETP timer) exceeds five minutes, as determined at decision step 152, this means that it has been more than 5 minutes since the set point was exceeded and, therefore, the control temperature is not controlling the operation of the incubator air heater. When the set point timer (SETP timer) exceeds 5 minutes, decision step 152 causes flow to branch to step 146 whereat the delay timer and the slew timer are reset thereby preventing subsequent attempts to slew for a period of at least 5 more minutes.

If decision step 152, on the other hand, determines that the set point timer has not exceeded five minutes indicating that the set point has been exceeded at least once in the last five minutes, then control passes to step 154 whereat the set point (SETP) is adjusted upwardly by a preset amount and the slew timer is reset. As indicated in connection with step 138, it is desirable to make the preset amount by which the set point is adjusted small so as to prevent rapid changes of temperature in the incubator. In the preferred embodiment of the invention, the preset amount by which the set point is adjusted upwardly at step 154 is 0.01°C. While this preset upward adjustment amount has been selected to be 0.01°C, it will be recognized that this preset amount can also be modified so that temperature adjustment will occur at somewhat faster or even slower rates.

After step 154, control passes onward to decision step 156 whereat the set point is checked against the upper set point limit which, for the preferred embodiment of the invention, is 36.5°C. If this upper set point limit is not exceeded, the control passes from the decision step 156 to the decision step 130. On the other hand, if the upper set point limit is exceeded, control passes from decision step 156 to step 158 whereat the set point is restored to the upper set point limit, i.e., 36.5°C.

Summarizing the operation of steps 144-158, these are the steps performed when upward slewing occurs. If the delay timer at decision step 148 has timed out, this condition indicates that the skin temperature has been below the lower skin temperature adaptive limit for at least 5 minutes and that the set point should be adjusted upwardly if other proper conditons are met so as to raise the temperature of the infant's skin.

The slew timer, as previously indicated, causes adjustment of the set point (SETP) to occur once a minute. After both the delay timer and the slew timer have both timed out, a further check is performed to determine whether the control temperature is the temperature causing the heater to be turned off rather than some other limit being exceeded and thereby causing a status bit to be set to a one in step 118. If it is determined by the decision step 152 that the set point has been exceeded at least once during the last five minutes, i.e., that the set point timer does not exceed five minutes, upward slewing is permitted and control passes onward so that the set point is shifted upwardly by a preset amount and the slew timer is reset. Subsequently, a limit check for the set point is made and if the upper limit is exceeded, the set point is restored to the upper limit and control passes on to decision step 130. If the upper limit of the set point is not exceeded, control passes directly to decision step 130.

The foregoing discussion in connection with FIGS. 3 and 4 has been directed to describing the operational flow performed by the computer 50. it will be readily recognized by those of skill in the art that other functions may be performed by the computer in addition to the operation of the control depicted by the flow chart of FIGS. 3 and 4.

Appended to this specification is a print-out of the program for implementing the above process on a PDP-11 computer. This particular program is representative of but one embodiment for directing the operations of a computer to perform the desired control function for turning on or turning off the air heater of an incubator. This program is written in PDP-11 Assembly Language, the details of which can be obtained from the Digital Equipment Corporation, if desired. The portions of the program appended hereto represent those portions for implementing the functions described by flow charts of FIGS. 3 and 4 as well as some other functions which are not part of the present invention. Other portions of the actual program which are not part of the invention have been omitted as these are not necessary for a complete understanding of the invention.

```
MONITOR:            ;MONITOR PROGRAM
MN2C00:             ;ALCYON FUNCTION
                    ;PERFORMED BY STATIONS
        TST     SUMSVR      ;TIME TO SAVE FOR SUMMERY ?
        BEQ     MN2005      ;BRANCH IF NOT
        ;YES, SET FLAGS
        MOV     #1,SUMSVC       ;SET ALCYON FLAG
        MOV     #17,SUMSVS      ;SET STATION FLAG, ONE BIT PER STATION
        CLR     SUMSVR
MN2005:
        MOV     #MXSTA0+2,R1    ;LOAD MAXIMUM OFFSET+2
        MOV     R1,-(R6)        ;STACK
MN2010: MOV     (R6)+,R1        ;RELOAD OFFSET
        SUB     #2,R1           ;MOVE TO NEXT STATION
        BGE     MN2020          ;BRANCH IF ANOTHER STATION
        JMP     MN2400          ;FINISHED
MN2020: MOV     R1,-(R6)        ;STACK OFFSET
        MOV     ACINV(R1),R5    ;LOAD BASE ADDRESS OF STATION'S ALCYON
                                ;INPUT VARIABLES
        MOV     R1,R2           ;SAVE STATION OFFSET IN R2
        MOV     CINSTN(R2),CINSTO(R2)   ;SAVE LAST ALCYON STATUS
        ;NEW STATUS WORD CLEARED IF NO REFERENCE ALARM
        ;LOAD INPUT VARIABLES
        MOV     ACINVA(R1),R4   ;LOAD ADDRESS OF VARIABLE ADDRESS ARRAY
        MOV     #CINVCT,R3      ;LOAD COUNT
        MOV     ADATSF(R2),R1   ;LOAD ADDRESS OF SCALE FACTORS' ARRAY
        MOV     AOFFST(R2),R0   ;LOAD ADDRESS OF DATA OFFSET ARRAY
        ;DATA SCALING
MN2022: JSR     R7,REGSAV       ;SAVE REGISTERS
        MOV     @R1,R2          ;LOAD SF (MULTIPLICAND)
        MOV     @(R4)+,R1       ;LOAD DATA (MULTIPLIER)
        MOV     #13.,R3         ;LOAD SHIFT COUNT (13. SHIFTS)
        CLR     R0              ;HIGH ORDER PRODUCT
MN2024: ROR     R0              ;SHIFT PRODUCT
        ROR     R1              ;SHIFT OUT MULTIPLIER
        BCC     MN2026          ;BRANCH IF NO ADD
        ADD     R2,R0           ;ADD MULTIPLICAND
MN2026: DEC     R3
        BNE     MN2024          ;LOOP BACK UNTIL FINISHED
        ;SHIFT RESULT BACK 3 PLACES
        ROL     R1
        ROL     R0
        ROL     R1
        ROL     R0
        ROL     R1
        ROL     R0
        MOV     R0,@R5          ;STORE RESULT
        JSR     R7,REGRES       ;RELOAD REGISTERS
        CMP     (R1)+,(R4)+     ;ADVANCE POINTERS
        ADD     (R0)+,(R5)+     ;ADD OFFSET
        DEC     R3              ;VARIABLE LOOP COUNT
        BLE     MN2038          ;BRANCH IF FINISHED
        ;SEE IF WE HAVE DONE VREF AND TREF
        CMP     #CINVCT-2,R3
        BNE     MN2022          ;LOOP BACK IF NOT
        ;AT THIS POINT WE HAVE ONLY PROCESSED VREF AND TREF
        ;CHECK THEM
        CMP     -(R5),VREFHI    ;CHECK VREF HI LIMIT
        BGT     MN2030          ;BRANCH IF ALARM
        ;IT'S OK, CHECK LOW LIMIT
        CMP     (R5),VREFLO
        BLT     MN2030          ;BRANCH IF ALARM
        ;NOW CHECK TREF
        CMP     -(R5),TREFHI    ;HI LIMIT
        BGT     MN2030          ;BRANCH IF ALARM
```

```
         CMP     (R5),TREFLO       ;LOW LIMIT
         BLT     MN2030            ;BRANCH IF ALARM
         ;REFERENCES ARE OK
         CMP     (R5)+,(R5)+       ;RESTORE POINTER
         ;SET UP REQUIRED INDICATORS
         CLR     CINSTN(R2)        ;CLEAR FOR NEW STATUS
         CLR     CALRMC(R2)        ;CLEAR CONSECUTIVE ALARM COUNTER
         BR      MN2022            ;CONTINUE PROCESSING

MN2030:  ;REFERENCE ALARM
         INC     SAMER6(R2)        ;INCREMENT REFERENCE ALARM COUNTER
         INC     CALRMC(R2)        ;INCREMENT CONSECUTIVE REFERENCE ALARM
                                   ;COUNTER
         CMP     CALRMC(R2),#6     ;SEE IF LIMIT IS EXCEEDED
         BLT     MN2010            ;BRANCH IF NOT, CONTINUE WITH NEXT STATION
         ;TIME LIMIT EXCEEDED, SET ALARM
         MOV     #REFA,CINSTN(R2)  ;CLEAR STATUS, SET ALARM
         DEC     CALRMC(R2)        ;DON'T LET COUNTER ROLL OVER
         BR      MN2010            ;CHECK NEXT STATION
MN2038:  ;FINISHED CONVERTING DATA, START PROCESSING
         MOV     ACINV(R2),R5      ;LOAD ADDRESS OF VARIABLES
         ;CHECK HEART RATE
         CMP     OFFSHR(R5),#62C0              ;50 PPM SCALE B-6
         BGT     MN2040            ;BRANCH IF HR DETECTED
         CLR     STAHRC(R2)        ;OTHERWISE CLEAR COUNTER
MN2040:  INC     STAHRC(R2)        ;INCREMENT COUNT
         CMP     #30.,STAHRC(R2)   ;DO WE HAVE ENOUGH POINTS ?
         BGT     MN2050            ;BRANCH IF NOT
         ;YES, SET FLAG
         BIS     #STAHRS,STASTS(R2)
MN2050:  ;COMPUTE ENVIRONMENTAL TEMPERATURE
         MOV     ACINV(R2),R5      ;LOAD ADDRESS OF VARIABLES
         ADD     #OFFTTW,R5        ;ADD OFFSET TO TTW
         MOV     ACIEC(R2),R4      ;LOAD ADDRESS OF PARAMETERS
         ADD     #2,R4             ;ADD OFFSET TO KTTW
         MOV     #4,R3             ;4 LOOPS
         JSR     R7,COEFMT         ;USE MULTIPLY SUBROUTINE
         ;CHECK FOR NO TS
         CMP     @R5,LOWTS         ;IS IT TOO LOW ?
         BGT     MN2060            ;BRANCH IF NOT
         ;NOT GETTING TS
         BIS     #NOTS,CINSTN(R2)  ;SET INDICATOR IN STATUS
         MOV     SAVETS(R2),@R5    ;USE PREVIOUS VALUE FOR BENEFIT OF SUMMARY
MN2060:  ;SAVE CURRENT TS IN CASE IT'S NOT AVAILABLE NEXT TIME
         MOV     @R5,SAVETS(R2)
         MOV     (R5)+,-(R6)       ;STACK SKIN TEMP
         MOV     R5,R1             ;R5 POINTS TO ESG
         MOV     R3,-(R6)          ;STACK TE
         MOV     R6,R5             ;SET R5 TO TE IN STACK
         SUB     2(R6),R3          ;COMPUTE ESG
         MOV     R3,(R1)+          ;STORE ESG
         MOV     #2,R3             ;2 LOOPS
         JSR     R7,COEFMT         ;COMPUTE SETP
         MOV     R3,(R1)+          ;STORE SETP
         MOV     (R6)+,(R1)+       ;STORE TE
         TST     (R6)+             ;STACK BOOKKEEPING
         SUB     #10.,R1           ;BACK TEMPERATURE POINTER BACK UP TO TA
         ;R4 IS PARAMETER POINTER, NOW POINTS TO UTA
         ;PAGE$
         ;SETUP FOR LIMIT CHECKS
         MOV     #1,R5             ;BIT POSITION
         MOV     #4,R3             ;4 LOOPS HERE
         ;START OF LOOP
MN2070:  MOV     (R1)+,R0          ;LOAD TEMP VALUE
         BIT     CINSTO(R2),R5     ;WAS IT SET ?
         BEQ     MN2080            ;BRANCH IF NOT
         ADD     CINDBD,R0         ;ADD DEAD BAND
MN2080:  CMP     R0,(R4)+
         BLT     MN2090            ;BRANCH IF LIMIT NOT EXCEEDED
         BIS     R5,CINSTN(R2)     ;SET BIT
MN2090:  ASL     R5                ;MOVE TO NEXT BIT
         DEC     R3                ;ARE WE FINISHED?
         BGT     MN2070            ;LOOP BACK IF NOT
         ;PUT SETP PARAMETER IN VARIABLE LIST
```

```
            MOV     -2(R4),4(R1)
            ;SEE IF SETP WAS EXCEEDED
            BIT     #SETP,CINSTN(R2);IS BIT SET ?
            BEQ     MN2095          ;BRANCH IF NOT
            ;SETP IS IN CONTROL OF TEMPERATURE, SET TIMER
            MOV     #18000.,SETPCT(R2)       ;5 MIN IN CLOCK TICKS
MN2095:     ;PROBE OFF ALARM CHECK
            SUB     #8.,R1   ;BACK TEMP POINTER TO TA
            MOV     #2,R3    ;2 LOOPS
MN2100:     MOV     (R1)+,R0         ;LOAD TEMP VALUE
            BIT     CINSTO(R2),R5    ;WAS IT SET ?
            BEQ     MN2110  ;BRANCH IF NOT
            SUB     CINDBD,R0        ;SUBTRACT DEAD BAND
MN2110:     CMP     R0,PDFFLM(R2)   ;LOW PROBE OFF LIMIT
            BLT     MN2120  ;BRANCH IF ALARM
            ;NO ALARM
            ASL     R5      ;MOVE TO NOT ALARM
            BIS     R5,CINSTN(R2)    ;SET BIT
            BR      MN2130
MN2120:     ;PROBE OFF ALARM
            BIS     R5,CINSTN(R2)    ;SET ALARM BIT
            ASL     R5      ;SKIP NOT ALARM BIT
MN2130:     ASL     R5      ;MOVE TO NEXT BIT
            DEC     R3      ;ARE WE FINISHED?
            BGT     MN2100  ;LOOP BACK IF NOT
            ;SET UP FOR ADAP LIMIT CHECK
            ;R1 (TEMP POINTER) IS AT ESG
            TST     -(R1)   ;MOVE TO TS
            ASL     R2      ;MULTIPLY STATION OFFSET BY 2
            MOV     R2,-(R6)         ;STACK
            ASR     R2      ;RESTORE
            ADD     #CINACT+4,@R6   ;ADD COUNTER BASE ADDRESS
            MOV     #2,R3   ;2 LOOPS, NOTE THIS COUNTER IS ALSO
                            ;USED AS AN OFFSET (DECREMENTED BY 2)
MN2170:     ;START OF LOOP
            SUB     #2,@R6
            CMP     @R1,(R4)+       ;CHECK LIMIT
            JMP     MN2180(R3)       ;MAKE APPROPRIATE CONDITIONAL BRANCH
MN2180:     BR      MN2200  ;LOWER LIMIT TEST
MN2190:     ;UPPER LIMIT TEST
            BGT     MN2220  ;BRANCH IF EXCEEDED
            BR      MN2280  ;TOO LOW, DON'T SET BIT
MN2200:     ;LOWER LIMIT TEST
            BGT     MN2280  ;TOO HIGH, DON'T SET BIT
MN2220:     ;SET BIT
            INC     @(R6)   ;INCREMENT COUNTER
            BIT     CINSTO(R2),R5   ;WAS SLEW BIT SET LAST TIME ?
            BNE     MN2230  ;BRANCH IF YES
            ;NOT IN SLEW MODE YET CHECK TIME
            CMP     @(R6),#300.     ;HAS 5 MIN ELAPSED?
            BLT     MN2290  ;BRANCH IF NOT
MN2230:     ;IN SLEW MODE
            BIS     R5,CINSTN(R2)    ;SET SLEW MODE IN NEW STATUS
            CMP     @(R6),#60.      ;HAS 1 MIN ELAPSED?
            BLT     MN2290  ;BRANCH IF NOT
            ;TIME TO ADJUST SET POINT
            JMP     MN2240(R3)       ;DO WE ADD OR SUBTRACT?
MN2240:     BR      MN2260  ;LOWER LIMIT,ADD
MN2250:     ;UPPER LIMIT,SUBTRACT
            SUB     @ACIEC(R2),@ACSETP(R2)
            ;HAVE WE EXCEEDED LIMIT
            CMP     @ACSETP(R2),@R4
            BLT     MN2270  ;BRANCH IF YES RESET
            BR      MN2280
MN2260:     ;LOWER LIMIT
            ;BEFORE ADDING TO SETP MAKE SURE IT IS CONTROLLING TEMPERATURE
            TST     SETPCT(R2)       ;SEE IF SETP CONTROL TIMER HAS TIMED OUT
            BGT     MN2265  ;BRANCH IF NOT
            BIC     #SLEWU,CINSTN(R2)        ;NOT IN CONTROL, CLEAR SLEW STATUS
            BR      MN2280          ;GO TO CLEAR COUNTER
MN2265:     ;O.K. TO ADD TO SETP
            ADD     @ACIEC(R2),@ACSETP(R2)
            ;HAVE WE EXCEEDED LIMIT
            CMP     @ACSETP(R2),@R4
            BLT     MN2280  ;BRANCH IF NO
            ;RESET SETPT
```

```
MN2270: MOV      @R4,@ACSETP(R2)
MN2280: CLR      @(R6)        ;CLEAR COUNTER
MN2290: TST      (R4)+        ;UPDATE POINTER
        ASL      R5           ;MOVE TO NEXT BIT
        ;ARE WE FINISHED?
        SUB      #2,R3
        BGE      MN2170       ;LOOP BACK IF NOT
        ;HEATER CONTROL , SETUP
        MOV      #1,R3        ;LOOP COUNTER (2 LOOPS,LAST ONE DIFFERENT)
        MOV      #CINHTB,R4   ;LOAD BASE ADDRESS OF BIT LISTS
        MOV      CINSTN(R2),R0
MN2300: ;START OF LOOP
        BIT      (R4)+,R0     ;TEST VARIOUS CONDITIONS
        BNE      MN2310
        BIS      R5,R0        ;SET BIT
MN2310: ASL      R5           ;MOVE TO ALARM BIT, THEN "OFF" BIT
        DEC      R3
        BLT      MN2320
        BR       MN2300
MN2320: ;SEE IF ALCYON IS TURNED "OFF"
        BIT      #STAOFF,STASTS(R2)
        BEQ      MN2322       ;BRANCH IF NOT SET
        ;ALCYON IS "OFF"
        BIS      R5,R0        ;SET "OFF" STATUS
MN2322: ;SEE IF STATION IS OCCUPIED
        BIT      #STAOCC+STAHRS,STASTS(R2)
        BEQ      MN2325       ;DON'T SLEW IF STATION IS EMPTY
        ;CLEAR SLEW BITS AND COUNTERS IF ANY ALARM SET
        BIT      (R4)+,R0     ;CHECK ALARMS, AND ALCYON "OFF"
        BEQ      MN2330       ;GO TO EXIT IF NO ALARMS
MN2325: BIC      #SLEWU+SLEWD,R0  ;CLEAR SLEW BITS
        CLR      @(R6)        ;CLEAR COUNTERS
        ADD      #2,@R6
        CLR      @(R6)
MN2330: ;FINISHED WITH ALCYON CONTROL FOR THIS STATION
        MOV      R0,CINSTN(R2)    ;SAVE NEW STATUS
        TST      (R6)+        ;RESTORE R6
        MOV      @R6,R5       ;LOAD STATION OFFSET
        BNE      MN2331       ;BRANCH IF THIS IS NOT SELF TEST STA
        JMP      MN2395       ;SELF TEST, JUMP TO END
        ;ALCYON INPUT VARIABLE ADDRESS LIST

CINV$0: ;STATION 0, SELF CHECK STATION
        .WORD    T.TREF
        .WORD    T.VREF
        .WORD    T.HR
        .WORD    T.RR
        .WORD    INDUMM       ;IMP
        .WORD    INDUMM       ;AM
        .WORD    INDUMM       ;TAUX
        .WORD    INDUMM       ;VAUX
        .WORD    T.TTW
        .WORD    T.TFW
        .WORD    T.TBW
        .WORD    T.TA
        .WORD    T.TS
CINV$1: ;STATION 1, NEW ALCYON
        .WORD    T.TREF
        .WORD    T.VREF
        .WORD    CHAN08       ;HR
        .WORD    CHAN09       ;RR
        .WORD    INDUMM       ;IMP, DUMMY
        .WORD    INDUMM       ;AM, DUMMY
        .WORD    INDUMM       ;TAUX
        .WORD    INDUMM       ;VAUX
        .WORD    CHAN13       ;TTW
        .WORD    CHAN12       ;TFW
        .WORD    CHAN14       ;TBW
        .WORD    CHAN11       ;TA
        .WORD    CHAN10       ;TS
CINV$2: ;STATION 2, OLD ALCYON
        .WORD    T.TREF
        .WORD    T.VREF
        .WORD    CHAN05       ;HR
        .WORD    CHAN06       ;RR
```

```
        .WORD   INDUMM     ;IMP, DUMMY
        .WORD   CHAN07     ;AM
        .WORD   INDUMM     ;TAUX
        .WORD   INDUMM     ;VAUX
        .WORD   CHAN03     ;TTW
        .WORD   CHAN02     ;TFW
        .WORD   CHAN04     ;TBW
        .WORD   CHAN01     ;TA
        .WORD   CHAN00     ;TS
CINV$3: ;STATION 3, 1-EAST STATION 1
        .WORD   S3CH07     ;TREF
        .WORD   S3CH15     ;VREF
        .WORD   S3CH08     ;HR
        .WORD   S3CH09     ;RP
        .WORD   S3CH10     ;IMP
        .WORD   INDUMM     ;AM, DUMMY
        .WORD   S3CH05     ;TAUX
        .WORD   S3CH13     ;VAUX
        .WORD   S3CH02     ;TTW
        .WORD   S3CH03     ;TFW
        .WORD   S3CH04     ;TBW
        .WORD   S3CH00     ;TA
        .WORD   S3CH01     ;TS
CINV$4: ;STATION 4, 1-EAST STATION 2
        .WORD   S4CH07     ;TREF
        .WORD   S4CH15     ;VREF
        .WORD   S4CH08     ;HR
        .WORD   S4CH09     ;RR
        .WORD   S4CH10     ;IMP
        .WORD   INDUMM     ;AM, DUMMY
        .WORD   S4CH05     ;TAUX
        .WORD   S4CH13     ;VAUX
        .WORD   S4CH02     ;TTW
        .WORD   S4CH03     ;TFW
        .WORD   S4CH04     ;TBW
        .WORD   S4CH00     ;TA
        .WORD   S4CH01     ;TS
COEFMT: ;SUBROUTINE TO MULTIPLY COEFFICIENTS TIMES INPUT
        ;VARIABLES, FOR ALCYON
        CLR     TECOMP
        CLR     TECOMP+2        ;CLEAR SUMMING AREA
COEFM1: MOV     (R5)+,TMPMUL    ;SET UP MULTIPLICAND
        CLR     TMPMUL+2
        EMT     33              ;MULTIPLY BY COEFFICIENT
        MOV     (R4),TMPMUL     ;COEFFICIENT SCALED B-14
        TST     (R4)+
        ADD     TMPMUL,TECOMP   ;FORM SUM
        ADC     TECOMP+2
        ADD     TMPMUL+2,TECOMP+2
        DEC     R3              ;MORE?
        BGT     COEFM1          ;LOOP BACK IF YES
        ;FINISHED WITH SUM, RESCALE AND RETURN RESULT
        MOV     TECOMP+2,R3
        ASL     TECOMP
        ROL     R3
        ASL     TECOMP
        RCL     R3
        RTS     R7              ;RESULT IN R3
        ;PAGE$
        ;STATION DATA BASE
        ;POINTERS
ACINVA: ;ADDRESSES OF INPUT VARIABLE ADDRESS LIST
        .WORD   CINV$0
        .WORD   CINV$1
        .WORD   CINV$2
        .WORD   CINV$3
        .WORD   CINV$4
ACINV:  ;ADDRESSES OF VARIABLE STORAGE ARRAY
        .WORD   CNVA$0
        .WORD   CNVA$1
        .WORD   CNVA$2
        .WORD   CNVA$3
        .WORD   CNVA$4
ADATSF: ;ADDRESSES OF     SF ARRAYS FOR INPUT DATA
        .WORD   DATS$0
        .WORD   DATS$1
```

```
            .WORD    DATS$2
            .WORD    DATS$3
            .WORD    DATS$4
AOFFST:  ;ADDRESSES OF OFFSETS (INTERCEPT)
            .WORD    OFFS$0
            .WORD    OFFS$1
            .WORD    OFFS$2
            .WORD    OFFS$3
            .WORD    OFFS$4
ACIEC:   ;ADDRESSES OF PARAMETER ARRAYS
            .WORD    CIEC$0
            .WORD    CIEC$1
            .WORD    CIEC$2
            .WORD    CIEC$3
            .WORD    CIEC$4
         ;ADDRESS ARRAY OF VARIABLES' FLAG ARRAYS
         ;ALCYON DATA BASE
          MXSTA0   =8.       ;4 REAL STATIONS
          MAXSTA   =4        ;4 STATIONS
          MXHTRB   =10       ;HEATER BIT FOR STA 4
         ;VARIABLE FLAG BIT DEFINITIONS
          VARMON = 1         ;VARIABLE MONITORED
          TSSENS = 2         ;VARIABLE REQUIRES TS TO BE MEANINGFUL
         ;PRINT FLAG BITS
          PRTRM1 = 200
          PRTRM2 = 100
          PRTRM3 = 40
         ;ALCYON STATUS BIT DEFINITIONS
          UTA  = 1           ;BIT 00
          UTS  = 2           ;BIT 01
          UESG = 4           ;BIT 02
          SETP = 10          ;BIT 03
          ALTA = 20          ;BIT 04
          N.ALTA = 40        ;BIT 05
          ALTS = 100         ;BIT 06
          N.ALTS = 200       ;BIT 07
          SLEWD = 400        ;BIT 08
          SLEWU = 1000       ;BIT 09
          HTR  = 2000        ;BIT 10
          ALRM = 4000        ;BIT 11
          OFF  = 10000       ;BIT 12
          REFA = 20000       ;BIT 13
          NOTS = 40000       ;BIT 14
CINHTB:  ;ALCYON CONTROL BIT COMBINATIONS
         ;HEATER ON CONDITIONS (NOT CONDITIONS)
            .WORD    UTS+UESG+UTA+SETP
         ;ALARM CONDITION, IF BOTH ARE CLEAR
            .WORD    N.ALTS+N.ALTA
         ;ALARM CONDITION TO CLEAR SLEW STATUS
            .WORD    ALRM+OFF+REFA
         ;PAGE$
```

While the foregoing description has been made with particular emphasis on a preferred embodiment of the invention as depicted in the accompanying drawings, it will be recognized by those skilled in the art that numerous modifications in form only may be made thereto. For example, while a particular digital computer has been shown for controlling the incubator air heater, it will be readily recognized by those skilled in the art that a special purpose controller can readily replace the specific digital computer and still perform the required functions as described in the flow charts. Furthermore, other modifications in form only may be made without departing from the spirit and scope of the invention as defined by the following claims.

What is claimed is:

1. A method of controlling the temperature inside an incubator having a heater for supplying warm air to said incubator, said method comprising the steps of:

a. measuring the temperature of the air inside said incubator,
b. measuring the temperature of the skin of an infant in the incubator,
c. measuring the temperature of at least one wall of said incubator, each said wall affecting, through heat radiation, the body temperature of the infant,
d. calculating an environment temperature and a control temperature, said environment temperature being a function of the measured air temperature and the measured wall temperature, and said control temperature being a function of the measured skin temperature of the infant and said environment temperature, and
e. turning off said heater when said control temperature exceeds a predetermined temperature.

2. The method of claim 1 wherein said control temperature is equal to the sum of about one half the skin temperature and about one half said environment temperature.

3. The method of claim 2 wherein said environment temperature is equal to the sum of about one half the air temperature and about one half the average of the measured wall temperature.

4. The method of claim 1 wherein said predetermined temperature is about 35.5°C.

5. A method of controlling the temperature inside an incubator having a heater for supplying warm air to said incubator, said method comprising the steps of:
   a. measuring the temperature of the air inside said incubator,
   b. measuring the temperature of the skin of an infant in the incubator,
   c. measuring the temperature of at least one wall of said incubator, each said wall affecting, through heat radiation, the body temperature of the infant,
   d. calculating an environment temperature and a control temperature, said environment temperature being a function of the measured air temperature and the measured wall temperature, and said control temperature being a function of the measured skin temperature of the infant and said environment temperature, and
   e. turning off said heater when (1) the air temperature exceeds a first predetermined temperature, or (2) the skin temperature exceeds a second predetermined temperature, or (3) said control temperature exceeds a third predetermined temperature, or (4) the difference between said environment temperature and the skin temperature exceeds a predetermined temperature difference.

6. The method of claim 5 wherein said first predetermined temperature is about 38.0°C, said second predetermined temperature is about 36.5°C, said third predetermined temperature is about 35.5°C, and said predetermined temperature difference is about 3.0°C.

7. The method of claim 6 wherein said predetermined temperature difference is about 2.0°C.

8. A method of controlling the temperature inside an incubator having a heater for supplying warm air to said incubator, said method comprising the steps of:
   a. measuring the temperature of the air inside said incubator,
   b. measuring the temperature of the skin of an infant in the incubator,
   c. measuring the temperature of at least one wall of said incubator, each said wall affecting, through heat radiation, the body temperature of the infant,
   d. calculating an environment temperature and a control temperature, said environment temperature being a function of the measured air temperature and the measured wall temperature, and said control temperature being a function of the measured skin temperature of the infant and said environment temperature,
   e. providing an upper skin temperature adaptive limit, and
   f. turning off said heater when said control temperature exceeds an upper control temperature limit,
   g. said upper control temperature limit being determined by providing an initial control temperature and lowering said initial control temperature at a predetermined rate, when the skin temperature exceeds said upper skin temperature adaptive limit for a time exceeding a predetermined time period, until the skin temperature equals or falls below said upper skin temperature adaptive limit or said upper control temperature limit falls to a predetermined lower limit temperature therefor, said predetermined rate being low enough to prevent infant apnea due to changing temperature inside the incubator.

9. The method of claim 8 wherein said predetermined time period is at least about 5 minutes.

10. The method of claim 8 wherein said predetermined rate is about 0.01°C per minute.

11. The method of claim 8 wherein said initial control temperature is about 35.5°C, said upper skin temperature adaptive limit is about 36.0°C, and said predetermined lower limit temperature is about 34.5°C.

12. A method of controlling the temperature inside an incubator having a heater for supplying warm air to said incubator, said method comprising the steps of:
   a. measuring the temperature of the air inside said incubator,
   b. measuring the temperature of the skin of an infant in the incubator,
   c. measuring the temperature of at least one wall of said incubator, each said wall affecting, through heat radiation, the body temperature of the infant,
   d. calculating an environment temperature and a control temperature, said environment temperature being a function of the measured air temperature and the measured wall temperature, and said control temperature being a function of the measured skin temperature of the infant and said environment temperature,
   e. providing a lower skin temperature adaptive limit and,
   f. turning off said heater when said control temperature exceeds an upper control temperature limit,
   g. said upper control temperature limit being determined by providing an initial control temperature and increasing said initial control temperature at a predetermined rate, when the skin temperature falls below said lower skin temperature adaptive limit for a timer exceeding a first predetermined time period and the length of time since said heater was last turned off does not exceed a second predetermined time period, until the skin temperature equals or exceeds said lower skin temperature adaptive limit or said upper control temperature limit rises to a predetermined upper limit temperature therefor, said predetermined rate being low enough to prevent infant apnea due to changing temperature inside the incubator.

13. The method of claim 12 wherein said first and said second predetermined time period is each at least about five minutes.

14. The method of claim 12 wherein said predetermined rate is about 0.01°C per minute.

15. The method of claim 12 wherein said initial control temperature is about 35.5°C, said lower skin temperature adaptive limit is about 35.5°C, and said predetermined upper limit temperature is about 36.5°C.

16. A method of controlling the temperature inside an incubator having a heater for supplying warm air to said incubator, said method comprising the steps of:
   a. measuring the temperature of the air inside said incubator,
   b. measuring the temperature of the skin of an infant in the incubator,
   c. measuring the temperature of at least one wall of said incubator, each said wall affecting, through heat radiation, the body temperature of the infant,
d. calculating an environment temperature and a control temperature, said environment temperature being a function of the measured air temperature and the measured wall temperature, and said control temperature being a function of the measured skin temperature of the infant and said environment temperature,
e. providing an upper and a lower skin temperature adaptive limit, and
f. turning off said heater when (1) the air temperature exceeds a first predetermined temperature, or (2) the skin temperature exceeds a second predetermined temperature, or (3) said control temperature exceeds an upper control temperature limit, or (4) the difference between said environment temperature and the skin temperature exceeds a predetermined temperature difference,
g. said upper control temperature limit varying between predetermined upper and lower temperature limits therefor, and (1) automatically decreasing at a predetermined rate, when the skin temperature exceeds said upper skin temperature adaptive limit for a time exceeding a first predetermined time period, until the skin temperature equals or falls below said upper skin temperature adaptive limit or said upper control temperature limit falls to said predetermined lower limit therefor, and (2) automatically increasing at said predetermined rate, when the skin temperature falls below said lower skin temperature adaptive limit for a time exceeding a second predetermined time period and the length of time since said heater was last turned off does not exceed a third predetermined time period, until the skin temperature equals or exceeds said lower skin temperature adaptive limit or said upper control temperature limit rises to said predetermined upper limit temperature therefor; said predetermined rate being low enough to prevent infant apnea due to changing temperature inside the incubator.

17. A control system for use in combination with an incubator adapted to receive an infant therein including a heater for supplying warm air to said incubator, to control said air heater comprising:
an incubator having top, bottom and side walls and a heater therein
a plurality of temperature sensor means disposed on said walls of said incubator to produce signals indicative of wall temperature, said walls affecting, through heat radiation, the body temperature of the infant,
a temperature sensor means adapted to be placed on the skin of the infant in the incubator to produce signals indicative of skin temperature,
a temperature sensor means disposed inside the incubator to produce signals indicative of air temperature inside the incubator,
means operatively associated with said sensor means and responsive to said wall temperature signals and said air temperature signals to produce signals indicative of an environment temperature and responsive to said skin temperature signals and said environment temperature signals to produce signals indicative of a control temperature, and
means responsive to said control temperature signals to turn off said heater when said control temperature exceeds an upper control temperature limit.

18. The control system of claim 17 additionally including means responsive to said skin temperature signals and said control temperature signals to gradually decrease said upper control temperature limit, at a rate low enough to prevent infant apnea due to temperature change, when said skin temperature remains above an upper skin temperature adaptive limit for a predetermined time.

19. The control system of claim 18 wherein said means is additionally operative to prevent said upper control temperature limit from falling below a predetermined lower limit therefor.

20. The control system of claim 17 additionally including means responsive to said skin temperature signals and said control temperature signals to gradually increase said upper control temperature limit, at a rate low enough to prevent infant apnea due to temperature change, when said skin temperature remains below a lower skin temperature adaptive limit for a predetermined time.

21. The system of claim 20 wherein said means is additionally operative to prevent said upper control temperature limit from rising above a predetermined upper limit therefor.

22. A control system for use in combination with an incubator adapted to receive an infant therein including an air heater for supplying warm air to said incubator, to control said air heater comprising:
an incubator having top, bottom and side walls and a heater therein
a plurality of temperature sensor means disposed on said walls of said incubator to produce signals indicative of wall temperature, said walls affecting, through heat radiation, the body temperature of the infant,
a temperature sensor means adapted to be placed on the skin of the infant in the incubator to produce signals indicative of skin tempeature,
a temperature sensor means to be disposed inside the incubator to produce signals indicative of air temperature inside the incubator,
means operatively associated with said sensor means and responsive to said wall temperature signals and said air temperature signals to produce signals indicative of an environment temperature and responsive to said skin temperature signals and said environment temperature signals to produce signals indicative of a control temperature and signals indicative of the difference between said environment temperature and said skin temperature, and
means responsive to said air temperature signals, said skin temperature signals, said control temperature signals, and said signals indicative of the difference between said environment temperature and said skin temperature to turn off said heater when said air temperature exceeds a first predetermined temperature, or said skin temperature exceeds a second predetermined temperature, or said control temperature exceeds an upper control temperature limit, or the difference between said environment temperature and said skin temperature exceeds a predetermined temperature difference.

* * * * *